United States Patent Office 3,151,696
Patented Oct. 6, 1964

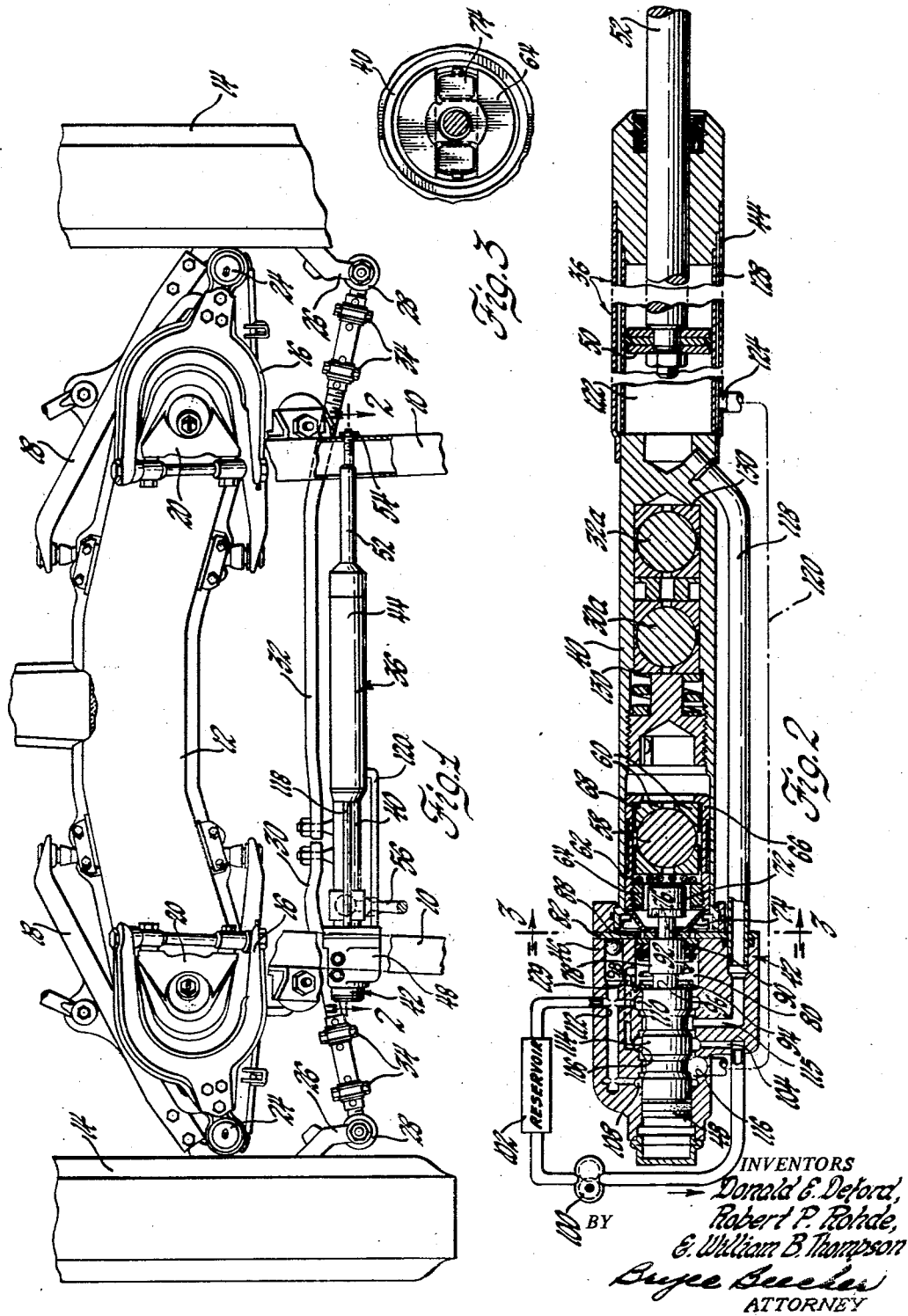

3,151,696
POWER STEERING APPARATUS
Donald E. Deford, Robert P. Rohde, and William B. Thompson, all of Saginaw, Mich., assignors to General Motors Corporation, Detroit, Mich., a corporation of Delaware
Filed Sept. 13, 1961, Ser. No. 137,893
1 Claim. (Cl. 180—79.2)

This invention relates to power steering and more particularly to a linkage booster of unique design and operation.

Automotive vehicles having independent front suspension assemblies are now conventionally steered through a so-called parallelogram linkage consisting of a pair of tie rods each actuating a steering knuckle arm and interconnected through a cross member ordinarily termed a "relay rod." It has been heretofore suggested that the power steering of such a vehicle could be expeditiously accomplished by substituting an integrated, in-line valve and power cylinder assembly for the relay rod component. However, using the proposed design, it is necessary to equip the power cylinder with ball stud-carrying sleeves affording the connection with the tie rods. These sleeves add unduly to the cost of the gear and, moreover, present clearance problems difficult to surmount.

The present invention has as its principal object to provide a linkage booster of the general type indicated which does not require use of the aforementioned sleeves.

Other objects and features of the invention will be apparent from the following description which will proceed with reference to the accompanying drawings wherein:

FIGURE 1 is a plan showing the front portion of the chassis of a vehicle equipped according to the invention, the engine being omitted and certain parts being shown broken away;

FIGURE 2 is a view in section on the line 2—2 in FIGURE 1; and

FIGURE 3 is a section on the line 3—3 in FIGURE 2.

Referring first to FIGURE 1, the numeral 10 denotes the side rail components of the vehicle frame, these being interconnected by a cross frame member 12. Secured to the cross frame member are independent suspension assemblies for the dirigible wheels 14. Each such suspension assembly comprises upper and lower control arms 16 and 18, respectively. The lower control arms have pivotal connection with the cross frame member 12, while the upper arms find pivotal support in a bracket member 20 itself supported by the cross frame member. Each of the control arm pairs 16, 18 are joined near the corresponding dirigible wheel through a steering knuckle support 24.

The dirigible wheels 14 are steered through knuckle arms 26 which have pivotal connection at 28 with tie rods 30 and 32. Each of the tie rods incorporates a turnbuckle device 34 whereby the rod may be lengthened or shortened as required. As shown, the tie rods are disposed at a level under the frame side rails 10 and are interconnected through an integrated, in-line valve and fluid motor assembly 36, the two connections being made through an adaptor 40 (FIGURE 2). This adaptor is disposed mediate the valve and motor components of the assembly.

Valve 42 is of the axial spool type including a housing 46 and a spool 48 reciprocal within the housing.

The motor includes a cylinder 44 of double wall construction and a piston 50 having a shaft 52 extending through the end of the cylinder for connection to the frame of the vehicle at 54.

Reverting to the valve component, it is to be noted that the spool 48 is actuated by a pitman arm 56 terminating in a ball stud 58 accommodated within the adaptor 40 between a pair of seats 60 housed by a sleeve 66, the seats being held in close engagement with the ball stud by force of a spring 62. Such spring is reacted by a plug 64 threaded into the sleeve 66 which is formed with an annular shoulder 68 abutted by the right hand seat 60.

Sleeve 66 and all that it contains moves as a unit with the spool 48. To this end the construction includes a split-flanged plug 64 (FIG. 3) threaded into the sleeve 66 and having abutting engagement with flats 72 at the inner end of the spool 48. Plug 64 accommodates a locking spider 74 preventing loosening of the plug. The body of the spider 74, on which a detail drawing will be found in U.S. Patent 2,996,048, abuts a washer 76 in turn abutting a land 78 integral with the spool 48. This land is located within a chamber 80 provided by the valve housing 46. A second larger washer or spacer 82 will be seen surrounding the washer 76. This washer provides a shoulder 88 shown as engaging a composite seal and spring seat 90. The spring 92 at its other end reacts against a washer 94 abutting the flush shoulders 96 and 98.

Spring 92 tends to maintain the spool 48 and the sleeve 66 in their positions shown, such positions corresponding to the straight ahead position of the dirigible wheels 14. Thus, axial displacement of these parts in either direction is marked by compression of the spring. When the same are moved rightwardly, the land 78 slides within the composite seal and spring seat 90 which is prevented from partaking of the rightward movement by the spacer 82. On leftward movement of the spool and sleeve, the spool and part 90 are carried along by the washer 76, causing compression of the spring.

As shown by FIGURE 2, the over-all power steering system includes a pump 100 drawing from a reservoir 102. The pressure fluid enters the valve through a passage 104 which opens to an annular groove 106. In addition to such groove the valve comprises annular grooves 108 and 110 communicating with a common passage 112 opening to the return line to the reservoir. At either side of the central land 114, which is functional with respect to the pressure passage 104, are passages 115 and 116 which communicate respectively with conduits 118 and 120. Conduit 118 opens to the left hand chamber 122 of the cylinder 44, conduit 120 to a port 124 in the outer wall of the cylinder 44. Fluid entering the space between the two walls of the cylinder finds ingress to the right hand chamber of the cylinder via a port 128 in the inner wall of the cylinder.

In addition to the ports previously mentioned, the valve housing has therein a port 129 interconnecting the annular pressure groove 106 and the chamber 80, which with the pump in operation is thus at all times open to the ingress of fluid at system pressure.

Returning now to the adaptor 40, it will be seen that the same houses in addition to the sleeve 66 and the parts therein contained seats 130 for the ball studs 30a and 32a carried by the tie rods 30 and 32. Tie rod 32 will be noted as substantially longer than tie rod 30 in order that the interconnection between the two tie rods may be made as shown. Contrary to expectations, it has been found that the use of tie rods of different lengths does not adversely affect the steering geometry.

It will be noted that with the tie rod ball studs 30a and 32a being contained in adaptor 40 intermediate the pitman arm ball stud 58 and the motor, a highly compact assembly is provided. Further, all three ball studs have their centers arranged on the common axis of the valve 42 and cylinder 44 so that reactive couples applied to assembly 36 by the pitman arm and tie rods 30 and 32 upon operation of the motor are minimized or completely eliminated. Any such reactions are confined to that produced through whatever friction may exist between the ball studs 30a, 32a and 58 and their respective seats 130 and 60.

Although the operation of the disclosed apparatus is probably already apparent, the same will be described. First, mention should be made of the fact that the valve shown is of the so-called "open-center" type which means that when the spool 48 is in its neutral position the lands thereof do not fully close the ports with respect to which they are functional. In other words, with the valve spool in the said position pressure fluid supplied by the pump 100 circulates to the valve and back to the reservoir 102 against the static pressure of the fluid in the cylinder 44.

Assuming a right turn, the valve spool is displaced axially to the left by the pitman 56 fully or substantially fully opening the pressure groove 106 to the conduit 118 extending to the chamber 122 in the cylinder 44. Such displacement of the valve spool closes off conduit 120 to pressure, but opens the same to exhaust via passage 112. Accordingly, the entire valve and cylinder unit is displaced to the left to swing the dirigible wheels to the right as desired.

It is believed unnecessary to detail herein a left turn since the action is merely the opposite of that just described. It should be obvious that with the porting as illustrated, rightward displacement of the valve is marked by the creation of a pressure differential across the piston 50 in favor of the chamber 126, resulting in axial displacement of the valve and cylinder unit in the rightward direction, effecting leftward turning of the dirigible wheels.

Irrespective of the direction of displacement of the valve spool 48, the effort imposed to achieve the displacement must overcome not only the resistance of the spring 92 but also the resistance of the pressure fluid contained in the chamber 80. Such fluid reacts on rightward displacement of the spool against the shoulder 96 and on leftward displacement of the spool against the composite seal and spring seat 90. These reaction areas are controlled by design to compensate for the diameter of the piston shaft 52, thereby to obtain a balance as well understood in the art. The advantage of the fluid pressure resistance resides in the fact that an artificial steering "feel" is given the operator. This resistance is directly proportional to the actual steering resistance, the pressure at 80 at any time being the same as prevails in the working chamber of the power cylinder.

What is claimed is:

In a vehicle having a pitman arm terminating in a ball stud and a steering linkage including a pair of generally transversely extending tie rods, an integrated in-line valve and fluid motor assembly comprising, a cylindrical housing, an axial spool valve coaxially arranged at one end of said housing, a fluid motor coaxially arranged at the other end of said housing and having a shafted piston, the shaft of said piston being mounted on the frame of the vehicle to support the adjacent end of said assembly, said pitman arm ball stud being received in said housing and supporting the valve end of said assembly, and a pair of ball studs received within said housing intermediate said valve and said motor, each being connected to a tie rod, said ball studs having the centers thereof aligned with the center of said pitman arm ball stud along the common axis of said valve and said motor to minimize reactive couples applied to said assembly through said linkage and said pitman arm upon operation of said motor.

References Cited in the file of this patent
UNITED STATES PATENTS

| | | |
|---|---|---|
| 2,562,881 | Baldwin et al. | Aug. 7, 1951 |
| 2,786,454 | Bertsch | Mar. 26, 1957 |
| 2,808,120 | Hunter | Oct. 1, 1957 |

OTHER REFERENCES

Automobile Engineer (Publication), April 1956, pp. 124–127.